UNITED STATES PATENT OFFICE.

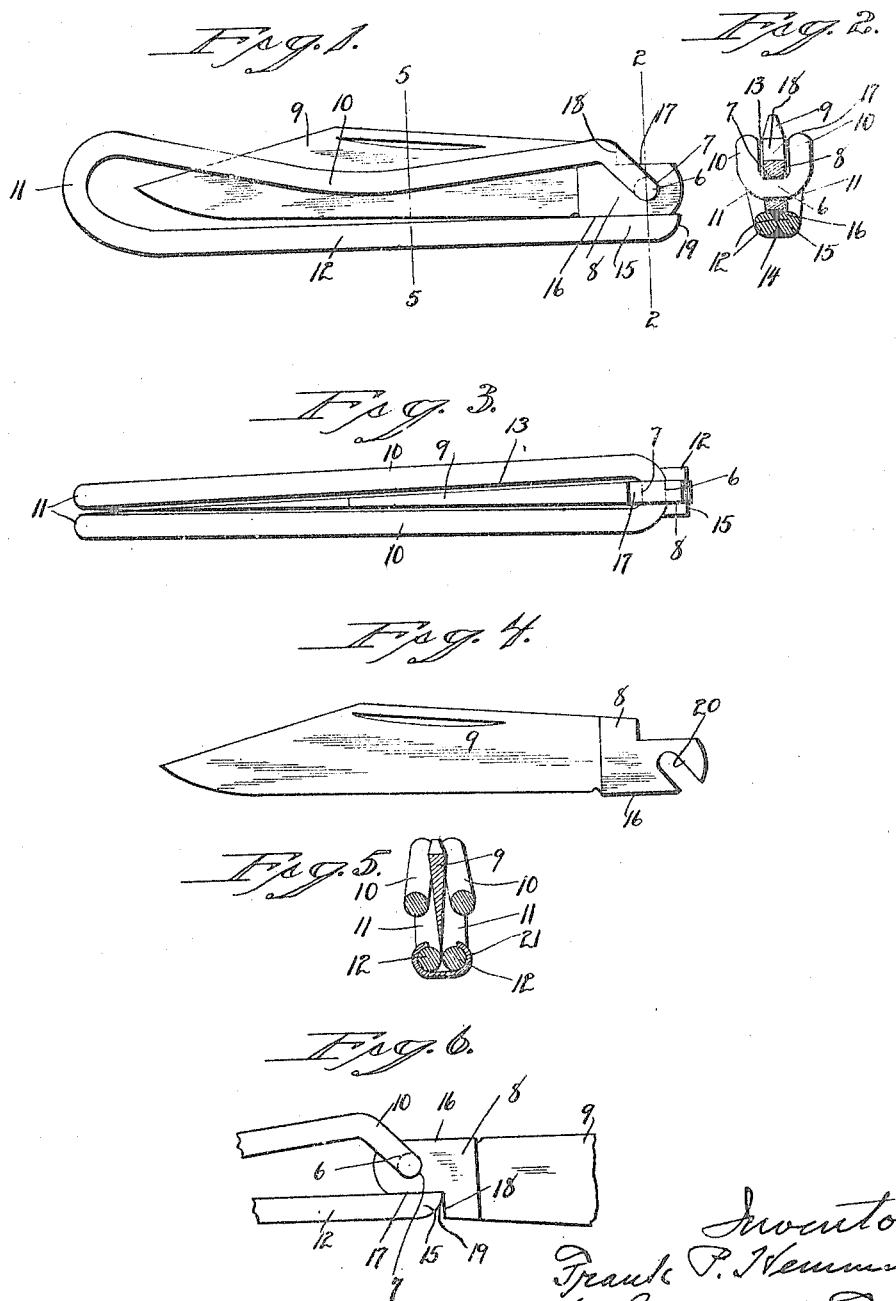

FRANK P. HEMMING, OF NEW HAVEN, CONNECTICUT.

POCKET-KNIFE.

1,248,852.

Specification of Letters Patent.   Patented Dec. 4, 1917.

Application filed July 12, 1917. Serial No. 180,045.

*To all whom it may concern:*

Be it known that I, FRANK P. HEMMING, a citizen of the United States, residing at New Haven, in the county of New Haven and State of Connecticut, have invented a new and useful Improvement in Pocket-Knives; and I do hereby declare the following, when taken in connection with the accompanying drawings and the characters of reference marked thereon, to be a full, clear, and exact description of the same, and which said drawings constitute part of this application, and represent, in—

Figure 1 a view in side elevation of one form which a knife having a one-piece handle constructed in accordance with my invention, may assume.

Fig. 2 a view thereof in transverse section on the line 2—2 of Fig. 1.

Fig. 3 a plan view thereof.

Fig. 4 a view in detached elevation of a modified form of knife-blade, for use in conjunction with my improved one-piece handle.

Fig. 5 a view of the knife in transverse section on the line 5—5 of Fig. 1, showing a slight modification of my improvement.

Fig. 6 a broken view in side elevation showing the knife open.

My invention relates to an improvement in pocket-knives, the object being to produce at an extremely low cost for manufacture, a simple, durable, convenient and safe pocket-knife, the handle of which is characterized by being made of a single piece of wire bent into shape to provide a housing for the sides and edge of the blade, and to provide a spring therefor.

With these ends in view, my invention consists in a pocket-knife having certain details of construction as will be hereinafter described and pointed out in the claims.

In carrying out my invention as shown in Figs. 1, 2 and 3 inclusive, I take a single piece of heavy wire and bend it midway of its length into two corresponding parts united by a trunnion loop 6 which passes through a perforation 7 in the shank 8 of a blade 9 which may be of any approved form and construction, the said corresponding parts of the one-piece wire handle, each comprising a downwardly bent side-member 10, a loop-member 11, and a spring-member 12. The side-members 10 aforesaid, are separated from each other so as to form between them a very narrow space or chamber 13 tapering from the inner or butt end of the knife outward, and just enough wider than the knife-blade 9 to readily receive the same. The said side-members 10 house the sides of the blade, while the said loop-members 11 protect the point thereof, to which they give wide clearance as plainly shown in Fig. 1. The spring-members 12 are brought into contact throughout their length as shown in Fig. 2, and by preference are joined together by soldering 14 as shown in Fig. 2. The ends 15 of the spring-members 12 coact with the lower edge 16 of the shank 8 so as to yieldingly hold the blade in its closed position as shown in Fig. 1 in which they also co-act to protect its edge. When, however, the blade is thrown into its fully open position as shown in Fig. 6, their ends 15 enter the notch 17 in the upper edge of the shank 8 and hold the blade in its open position, the shoulder 18 of the notch engaging with the rounded terminals 19 of the ends 15 and preventing the blade from folding backward, so to speak. It will be noticed by reference to Fig. 3 that the pivot portion of the loop 6 of the one-piece handle is made straight for the length of the perforation 7 in the blade shank 8. In the construction shown by Figs. 1 to 3 inclusive, the wire forming the one-piece handle must be passed through the perforation 7 before the wire is bent into form to produce the knife-handle. If desired, however, an inclined slot 20 may be formed in the shank 8 of the blade 9 as shown in Fig. 4, permitting the handle to be bent into shape prior to being assembled with the blade. The slot 20 of the blade is then slipped over the trunnion loop 6 of the handle, after which the slot is closed around the trunnion by a simple operation. In the modified construction shown by Fig. 6, the solder 14 is dispensed with and the spring-members 12 held together by a transversely arranged clip 21.

I claim:—

1. As a new article of manufacture, a pocket-knife having a blade, and a one-piece wire handle bent to form a housing for the blade, a trunnion for the blade and a spring for coöperation with the shank of the blade to hold the same in its open and closed positions.

2. As a new article for manufacture, a pocket-knife comprising a blade, and a one-piece wire handle having a trunnion-loop formed from the central portion of the wire, side-members for the protection of the sides of the blade, end-loops for the protection of the point of the blade, and spring-members which protect the edge of the blade and coact with the shank thereof for holding the blade in its open and closed positions.

3. As a new article of manufacture, a pocket-knife having a blade, and a one-piece wire handle bent to form a trunnion for the blade.

In testimony whereof, I have signed this specification in the presence of two subscribing witnesses.

FRANK P. HEMMING.

Witnesses:
   FREDERIC C. EARLE,
   C. L. WEED.